United States Patent [19]
Buehl

[11] 4,328,017
[45] May 4, 1982

[54] METHOD AND APPARATUS FOR MAKING OPTICAL FIBER WAVEGUIDES
[75] Inventor: Walter M. Buehl, Corning, N.Y.
[73] Assignee: Corning Glass Works, Corning, N.Y.
[21] Appl. No.: 161,011
[22] Filed: Jun. 19, 1980
[51] Int. Cl.³ .................. C03B 19/06; C03B 37/07; C03B 37/075
[52] U.S. Cl. ......................... 65/3.12; 65/18.2; 65/144; 65/160
[58] Field of Search .............. 65/3.12, 144, 18.2, 65/160; 427/163, 167, 237; 118/724, 725

[56] References Cited
U.S. PATENT DOCUMENTS

| | | | |
|---|---|---|---|
| 4,117,802 | 10/1978 | Le Sergent et al. | 427/237 X |
| 4,233,045 | 11/1980 | Sarkar | 65/3.12 |
| 4,235,616 | 11/1980 | Siegfried | 65/3.12 |
| 4,263,032 | 4/1981 | Sinclair et al. | 427/163 X |

FOREIGN PATENT DOCUMENTS 2922795 12/1979 Fed. Rep. of Germany ....... 65/3.12

*Primary Examiner*—Richard V. Fisher
*Attorney, Agent, or Firm*—William J. Simmons, Jr.

[57] ABSTRACT

A glass optical waveguide preform is prepared by chemical reaction of vapor ingredients within a bait tube. As the reactants flow through the bait tube, a hot zone traverses the tube to cause the deposition of soot in a section of the tube downstream of the hot zone. An axially disposed heater enhances the thermophoresis effect within the tube, thereby increasing deposition rate and efficiency.

4 Claims, 9 Drawing Figures

METHOD AND APPARATUS FOR MAKING OPTICAL FIBER WAVEGUIDES

CROSS-REFERENCE TO RELATED APPLICATION

This application is related to U.S. patent application Ser. No. 161,012 for "Apparatus for Making Optical Fiber Waveguides" filed June 19, 1980.

BACKGROUND OF THE INVENTION

The present invention relates to an improved apparatus for forming blanks from which optical waveguide fibers are drawn.

Certain glass making processes, particularly vapor deposition processes, have been commonly employed in the formation of optical waveguide blanks. In one such process, the source material vapor is directed into a heated tube wherein it reacts to form a material which is deposited in successive layers. The combination of deposited glass and tube is collapsed to form a draw blank which can be later heated and drawn into an optical waveguide fiber.

In order to obtain uniform deposition along the length of the substrate tube, a serial deposition process has been employed. That is, reactants are fed into the end of the tube, but deposition occurs only in a narrow section of the tube immediately downstream from the zone which is heated by a flame. The flame moves up and down the tube to move the reaction and thus the region of glass deposition serially along the tube.

One of the limitations of such a process is a comparatively low effective mass deposition rate. To increase the deposition rate it appears to be necessary to increase the inside diameter of the substrate tube to provide a greater collection surface area. However, since heat is supplied from the outside of the tube, a larger tube diameter results in a lower vapor temperature at the axis of the tube. Moreover, the flow profile across the tube is such that maximum flow occurs axially within the tube. As tube diameter increases, a smaller portion of the reactant vapor flows in that region of the tube adjacent the wall where reaction products are more readily collected on the inner surface of the tube.

Various attempts have been made to increase the deposition efficiency and the rate at which glass is deposited on the inner surface of the bait tube. In U.S. Pat. No. 4,117,802 a hollow cylindrical element is inserted into the downstream end of the bait tube, the closed end of the cylindrical element terminating in the hot zone. The reactants are caused to flow around the cylindrical element and are therefore channeled close to the heated bait tube. Thus, a greater portion of the reactants are said to react and form a part of the glassy deposit on the inner surface of the bait tube. A coolant gas flows through the cylindrical element for the stated purpose of reducing the amount of glass deposited on its surface. It has been found that the effect of the coolant gas would be to increase the deposition of glass soot on the cylindrical member, thus reducing the amount of glass soot available to be deposited on the inner surface of the bait tube and eventually adversely restricting the flow of gases through the annular channel between those two cylindrical members.

An apparatus for increasing the efficiency of glass deposition in a vapor deposition process for making optical waveguide preforms is taught in U.S. patent application Ser. No. 913,754 filed June 8, 1978, now abandoned, and entitled "Method of Making Large Diameter Optical Waveguide Preforms", the corresponding West German application having been published Dec. 13, 1979 as No. 2,922,795. A baffle tube extends into that end of the bait tube into which the reactants flow. The baffle tube, which traverses the bait tube along with the burner, ends just short of the hot zone so that no soot is deposited thereon. A gas flowing from the baffle tube creates a gaseous mandrel which confines the flow of reactant vapors to an annular channel adjacent the bait tube wall in the hot zone, thereby increasing deposition rate and efficiency.

Another apparatus which was developed for the purpose of increasing the efficiency of glass deposition in a vapor deposition process is taught in U.S. patent application Ser. No. 963,837 filed Nov. 27, 1978 and entitled "Apparatus and Method for Making Optical Filament Preform", now U.S. Pat. No. 4,233,045. A reactant feed tube extends into one end of the bait tube and terminates just short of the hot zone where reaction occurs. The end of the feed tube traverses the bait tube along with the burner which generates the hot zone. Reactants flow radially from slots in the end of the wall of the feed tube and combine with a flushing gas to form a mixture which flows in a spiral path through the hot zone.

U.S. patent application Ser. No. 38,775 filed May 14, 1979 and entitled "Optical Waveguide Manufacturing Process and Article", now U.S. Pat. No. 4,235,616, teaches another apparatus for increasing deposition efficiency. A hollow cylindrical substrate is provided within which is disposed a burner having a substantially radial flame. Reactants are flowed into the hollow cylindrical substrate in the annular space between the inner surface of the substrate and the exterior of the burner. A hot zone is established within the interior of the substrate in the vicinity of the radial flame so that the reactants are reacted to produce a suspension of particulate material. Also, a shield may be provided surrounding the burner within the hollow substrate, and a stream of gas flowed within the shield around the burner to confine the flow of particulate material to an annular channel adjacent to the inner surface of the substrate increasing deposition efficiency of the particulate material on the inside surface of the substrate.

It is therefore an object of the present invention to improve the deposition efficiency of a process whereby a reactant vapor flows into and reacts within a heated tube to form a layer therein.

Another object is to provide an efficient vapor deposition process which is not subject to flow-impeding glass buildups that are inherent in certain prior art processes.

SUMMARY OF THE INVENTION

Briefly, the present invention relates to an apparatus for manufacturing a preform which is intended to be subsequently drawn into an optical fiber waveguide. This apparatus is of the type that includes means for supporting a first tube, and first heating means for heating a portion of the first tube to form a hot zone therein. The apparatus includes means for providing relative longitudinal movement between the first tube and the heating means. Means are provided for introducing into the first tube a reactant gas mixture which flows through the hot zone, and when heated therein, forms particulate material, at least a portion of which flows downstream from the hot zone where at least a portion thereof comes to rest and forms a deposit on the inner surface of the first tube in a region thereof that is cooler than that portion of the first tube that surrounds the hot zone. The improvement of the present invention comprises axial heating means disposed axially in the first tube. At least a portion of the axial heating means is disposed immediately downstream from the hot zone in the vicinity of the deposit of particulate material.

DESCRIPTION OF THE PREFERRED EMBODIMENT

Figure 1:
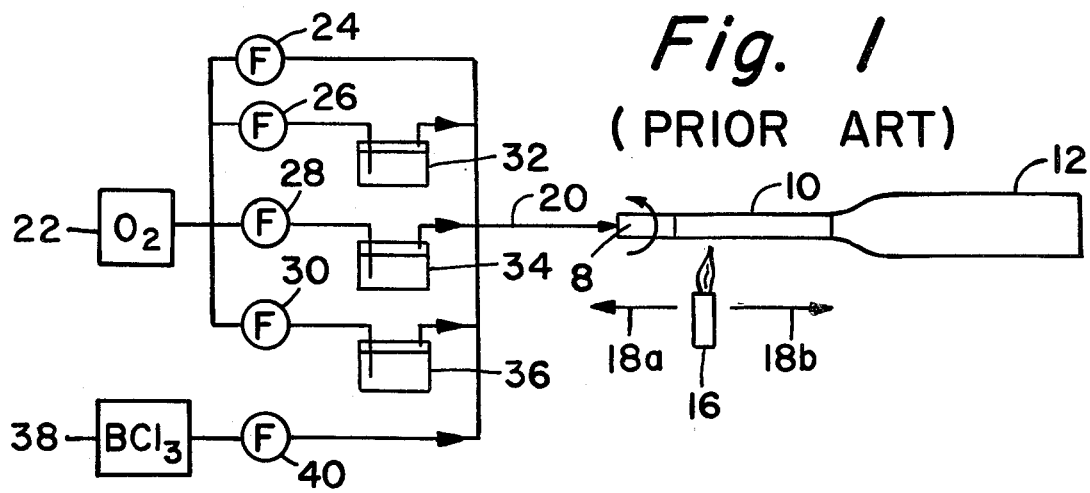
FIG. 1 is a schematic representation of a prior art apparatus for depositing a glass layer within a tube.
Figure 2:
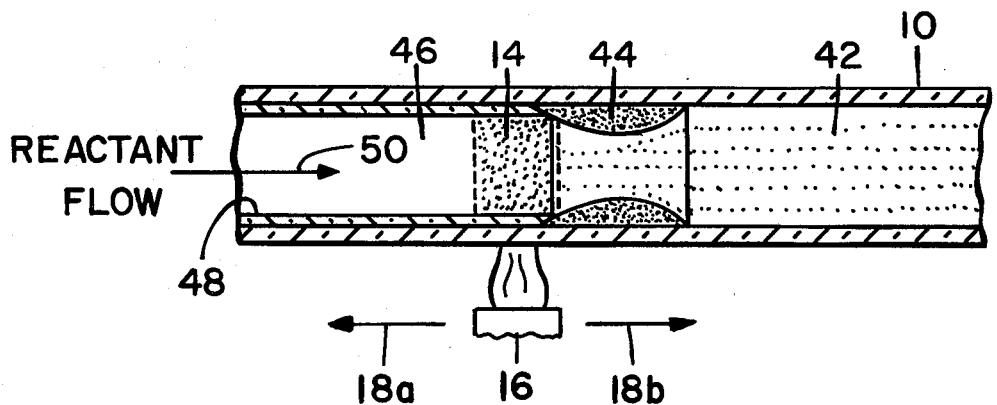
FIG. 2 shows a section of the tube of FIG. 1 depicting observed conditions during processing.

FIGS. 1 and 2 show a prior art system comprising a substrate or bait tube 10 having handle tube 8 affixed to the upstream end thereof and exhaust tube 12 affixed to the downstream end thereof. Tubes 8 and 12 are chucked in a conventional glass turning lathe (not shown), and the combination is rotated as indicated by the arrow. The handle tube 8, which may be omitted, is an inexpensive glass tube having the same diameter as the substrate tube, and it does not form a part of the resultant optical waveguide. A hot zone 14 is caused to traverse tube 10 by moving heating means 16 as schematically depicted by arrows 18a and 18b. The term "hot zone" is often used to refer to that portion of the bait tube which is sufficiently hot to cause it to glow, the temperature of that region being about 1100° C. or greater. The width of the hot zone depends upon such parameters as the size and speed of the burner. Heating means 16 can consist of any suitable source of heat such as a plurality of burners encircling tube 10. Since tube 10 is rotated, the temperature around the circumference is substantially uniform. Reactants are introduced into tube 10 via inlet tube 20, which is connected to a plurality of sources of gases and vapors. In FIG. 1, flow meters are represented by a circle having the letter "F" therein. A source 22 of oxygen is connected by flow meter 24 to inlet tube 20 and by flow meters 26, 28 and 30 to reservoirs 32, 34 and 36, respectively. A source 38 of boron trichloride is connected to tube 20 by a flow meter 40. Reservoirs 32, 34 and 36 contain normally liquid reactant materials which are introduced into tube 10 by bubbling oxygen or other suitable carrier gas therethrough. Exiting material is exhausted through exhaust tube 12. Not shown is an arrangement of mixing valves and shutoff valves which may be utilized to meter flows and to make other necessary adjustments in composition.

Burner 16 initially moves at a low rate of speed relative to tube 10 in the direction of arrow 18b, the same direction as the reactant flow. The reactants react in hot zone 14 to produce a powdery suspension of particulate oxidic material, often referred to as soot, which is carried by moving gas to region 42 which is downstream from the hot zone. A portion of the soot particles impinges upon and adheres to the bait tube wall, thus causing a soot buildup 44 in that portion of region 42 immediately downstream from the hot zone. The length of the buildup is generally about 1.5–2 times the diameter of the bait tube.

Figure 3:
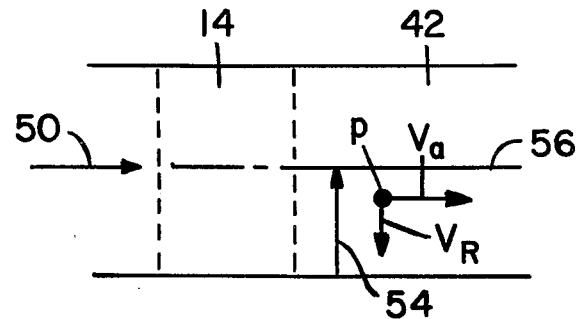
FIG. 3 is a schematic diagram illustrating the velocity components of a particle flowing in the deposition region of a substrate tube.

Because of the relatively high soot deposition efficiencies which have been observed, it has been evident that soot particles produced in region 14 remote from the tube walls are subjected to a force which imparts a radial velocity component to the particles. This phenomenon can be explained by referring to the diagram of FIG. 3. When reactants 50 flow into hot zone 14, soot particles are formed, one of which is shown as particle p. In hot zone 14 particle p and the gaseous products of reaction become heated. Thus, in region 42, wherein the temperature of the wall portion of tube 10 is lower than that of the flowing particles and gases, a temperature gradient exists between the wall and the tube axis 56 as indicated by arrow 54. Particle p has an axial velocity component $V_a$ due to the reactant flow which has the tendency to cause the particle to move through region 42 and into exhaust tube 12. However, the rate of soot deposition in region 42 is sufficiently high as to imply the existence of a force which imparts a velocity component $V_R$ to particle p which drives it toward the wall of tube 10. Of the various possible contributors to radial velocity component $V_R$, the thermophoresis component $V_t$ resulting from temperature gradient 54 has the greatest effect. For a discussion of this effect see the publication, P. G. Simpkins et al. "Thermophoresis: The Mass Transfer Mechanism in Modified Chemical Vapor Deposition", Journal of Applied Physics, Vol. 50, No. 9, September 1979, pp. 5676–5681.

It is noted that essentially no soot is formed in region 46 of tube 10 upstream from hot zone 14. As burner 16 continues to move in the direction of arrow 18b, hot zone 14 moves downstream so that a part of soot buildup 44 extends into the hot zone and is consolidated thereby to form a unitary, homogeneous glassy layer 48. Such process parameters as temperatures, flow rates, reactants and the like are discussed in the publications J. B. MacChesney et al., Proceedings of the IEEE, 1280 (1974) and W. G. French et al., Applied Optics, 15 (1976). Reference is also made to the text *Vapor Deposition*, Edited by C. F. Powell et al., John Wiley and Sons, Inc. (1966).

When burner 16 reaches the end of tube 10 adjacent to exhaust tube 12, the temperature of the flame is reduced and the burner returns in the direction of arrow 18a to the input end of tube 10. Thereafter, additional layers of glassy material are deposited within tube 10 in the manner described above. After suitable layers have been deposited to serve as the cladding and/or core material of the resultant optical fiber waveguide, the temperature of the glass is increased to about 2200° C. for high silica content glass to cause tube 10 to collapse. This can be accomplished by reducing the rate of traverse of the hot zone. The resultant draw blank is then drawn in accordance with well-known techniques to form an optical fiber waveguide having the desired diameter. Alternatively, the uncollapsed blank may be subsequently reheated and the hole collapsed, or the hole may be collapsed during the drawing process.

To optimize the process from the standpoint of reaction, high temperatures are utilized in the deposition process. For the usual silica based system, temperatures at the substrate wall are generally maintained between about 1400° and 1900° C. at the moving position corresponding with the hot zone. Indicated temperatures are those measured by a radiation pyrometer focused at the outer tube surface.

It is commonly known that one of the factors which limits deposition rate is the rate of sintering deposited soot to form a transparent glass layer. For a given composition of glass to be deposited, there is a maximum layer thickness of glass that can be sintered using the optimal combination of hot zone width, peak temperature of the hot zone and burner traverse rate. If the thickness of the sintered glass layer can be kept to the maximum value for different tube diameters, deposition rate increases proportionately with the tube inside diameter because of increased surface area. However, because of the nature of flow dynamics of the reactant vapor stream and soot particle dynamics, the percentage of produced soot which deposits in the substrate tube decreases with increased tube diameter.

Figure 4:
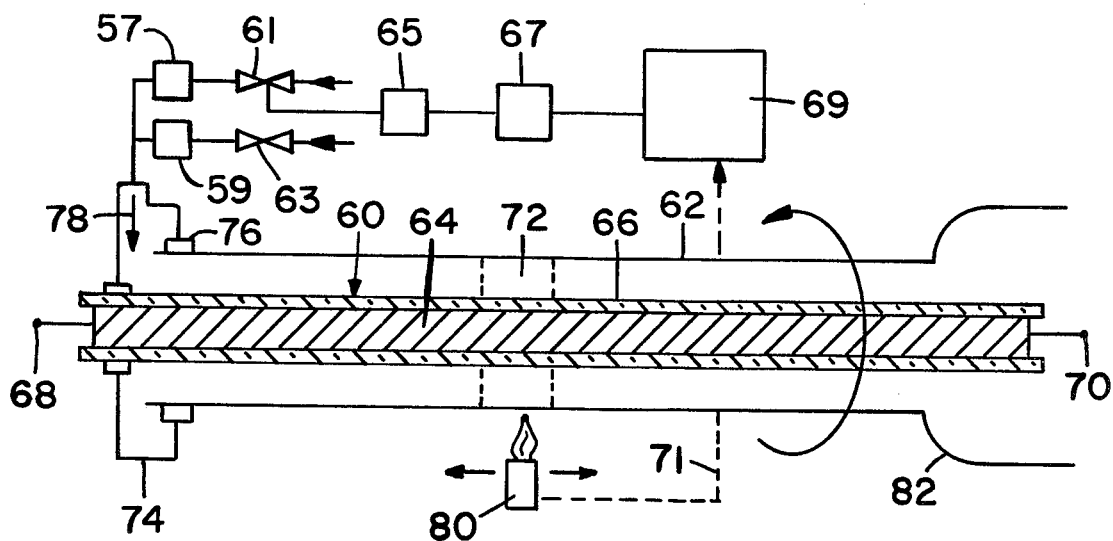
FIG. 4 is a schematic representation of an apparatus constructed in accordance with the present invention.

In accordance with the present invention means is provided for increasing the radial velocity component $V_t$ of the soot particles in that portion of the bait tube just downstream from the hot zone. An apparatus for performing this function is shown in FIG. 4 wherein axially disposed heater 60 extends throughout the length of substrate or bait tube 62. Heater 60 comprises a heating element 64 supported within tube 66. Because of the high operating temperatures within bait tube 62, tube 66 should be formed of a refractory material such as alumina, silica or the like. Since optical waveguides generally contain silica, and since other refractory materials may adversely affect the purity of the resultant product, silica is the preferred material. Element 64 should be in good thermal contact with tube 66 so that it can efficiently conduct thermal energy thereto. Electrical leads 68 and 70 are connected to opposite ends of element 64. The input end of tube 62 is connected to heater 60 by member 74, a rotating seal 76 being disposed between tube 62 and member 74. Alternatively, the heater could be rigidly connected to the ends of tube 62 so that it rotates therewith. Reactants 78 flow through member 74 and into the bait tube. Burner 80 and exhaust tube 82 function in the manner described in conjunction with FIG. 1.

Figure 5:
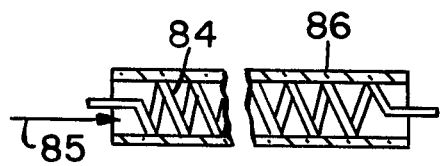
FIGS. 5, 6 and 9 show cross-sectional views of various heating elements which may be employed in the apparatus of FIG. 4.
Figure 6:
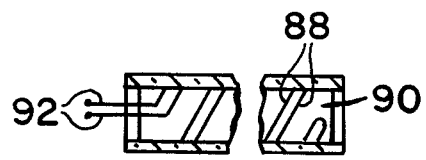

Heating element 64 can consist of any element which is capable of increasing the temperature at the surface of heater 60 to a sufficiently high value to enhance the thermophoresis effect within tube 62. Heater temperatures as low as about 800° C. have been found to be effective, the deposition efficiency increasing with increased heater temperature. Maximum heater temperature is limited by the materials employed, i.e., if the temperature thereof becomes too high, the heater and/or the bait tube can become damaged. One possible heater construction is shown in FIG. 5. A helical wire resistance element 84 is disposed within a silica tube 86. Many known metals and alloys are suitable for use as element 84; some suitable materials are disclosed in U.S. Pat. Nos. 2,372,212 and 2,957,154. As shown in FIG. 6, the resistance wire 88 may be wound, on a refractory core 90 such that both leads 92 extend from the same end. As illustrated by arrow 85 of FIG. 5, an inert gas may flow over the heating element to increase its lifetime.

A ceramic heating element could also be employed. A commercially available bayonet-type helical silicon carbide heating element is manufactured by the Carborundum Company and sold under the trademark "GLOBAR".

The embodiment of FIG. 4 as heretofore described operates as follows. Reactants 78 flow through member 74 and into bait tube 62. Upon reaching hot zone 72 the reactants form soot particles which are carried downstream toward exhaust tube 82. Because the soot particles and other reaction products have been heated in the hot zone, the soot particles are forced toward the cooler bait tube wall just downstream from the hot zone due to the thermophoresis effect described above. Since the products of reaction cool after leaving the hot zone, the thermophoresis effect would rapidly become negligible in a conventional apparatus. Heater 60 is heated to a sufficiently high temperature to provide an appropriate thermal gradient along the entire bait tube. Thus, the radial velocity of the soot is increased, and a larger percentage thereof is driven to the bait tube wall along the entire portion of the bait tube downstream of the hot zone. In this manner, deposition of soot is enhanced in the region immediately downstream from the hot zone in the region where soot conventionally deposits, and additionally, an appreciable amount of soot deposits further downstream from the usual deposition region. Efficiencies approaching 100% can thus be achieved.

If the temperature at the surface of heater 60 is high enough, little or no soot will deposit thereon because of the high thermal gradient established between heater 60 and the inner surface bait tube 62.

Figure 7:
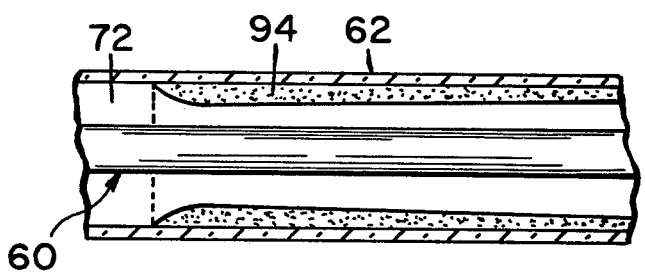
FIG. 7 shows a section of the tube of FIG. 4 depicting a soot deposit therein.

Because the thermophoresis effect exists throughout the bait tube, much more of the soot which normally would have been exhausted into tube 82 now is forced toward the bait tube wall and deposits thereon. Instead of forming a relatively short deposit such as that illustrated by numeral 44 in FIG. 2, the apparatus of FIG. 4 forms a more elongated deposit 94 as shown in FIG. 7. This causes the thickness of the deposited glass layer to be greater at the exhaust end of tube 62 than at the input end thereof.

Figure 8:
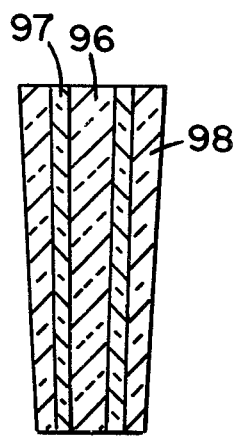
FIG. 8 is a cross-sectional view of one type of draw blank which can be formed by the apparatus of the present invention.

If a preform having a glass layer of nonuniform thickness were collapsed to eliminate the aperture, the core portion of the resultant draw blank would have a nonuniform diameter as shown in FIG. 8 wherein core portion 96 is tapered. Cladding portion 97 has a substantially uniform thickness. If such a blank were drawn into a fiber having a uniform outer diameter, the core diameter would vary from one end to the other. A fiber having a uniform core diameter could be formed by providing the draw blank with an additional cladding layer 98, the thickness of which is greatest at that end of the blank at which the diameter of core portion 96 is greatest. The core of a fiber drawn from the preform shown in FIG. 8 can be made to have a substantially uniform diameter. Layer 98 can be provided by depositing a layer of glass on the outer surface of cladding portion 97 by the flame hydrolysis process or by inserting the blank comprising portions 96 and 97 into a tube 98 having a nonuniform wall thickness.

Figure 9:
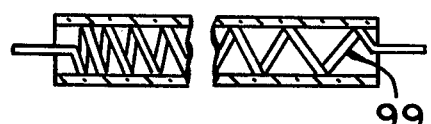

Alternatively, means could be provided for equalizing the thickness of glass deposition throughout the length of bait tube 62. For example, heater 60 can be designed such that the temperature drop between it and tube 62 is greatest at the input end of tube 62. This can be accomplished by the embodiment of FIG. 9 wherein coil 99 of heater wire is more tightly wound at one end, the winding pitch varying gradually toward the other end.

The deposit thickness could also be equalized by varying the reactant flow as burner 80 traverses tube 62. Flow control apparatus of the type disclosed in U.S. Pat. No. 3,826,560 may be employed. As shown in FIG. 4, various reactants flow into member 74 through valves including valves 61 and 63. Carrier gas flows through valves 61 and 63 and into reservoirs 57 and 59, respectively where reactant vapor is picked up as described in connection with FIG. 1. The manner in which it is desired to vary the carrier gas is programmed into controller 69. As illustrated by dashed line 71, the position of burner 80 is an input to the controller, which provides a signal to signal converter 67. The converter in turn drives valve motor 65 which controls the amount of carrier gas flowing through valve 61. Similarly, valve 63 and any additional valves may be adjusted by controller 69. The flow of reactants 78 is adjusted so that it is at a maximum when burner 80 is situated at the upstream end of tube 62, the reactant flow gradually decreasing as burner 80 traverses tube 62 toward exhaust tube 82.

Any of the methods described above can be employed to form one or more layers on the inner surface of tube 62, which layers will form the cladding and/or core material of the resultant optical fiber waveguide. As described above, the temperature of tube 62 is increased to cause it to collapse, and the resultant draw blank is drawn to form an optical fiber waveguide.

What is claimed is:

1. The method of manufacturing an optical preform, which includes the steps of
   passing through a tube a gas which, when heated, forms glass particles,
   moving a heat source along the outside of said tube whereby at least a portion of said gas is converted to glass particles and at least a portion of said glass particles is deposited on the inside of said tube,
   placing a cylindrically-shaped member of refractory material within said tube so that it extends axially throughout the entire length of said tube, and
   heating said member in such a manner that a temperature gradient is generated between said tube and said member, the temperature gradient being greatest at the upstream end of said tube and gradually decreasing toward the downstream end of said tube to provide greater uniformity in the deposition of glass particles throughout the length of said tube.

2. In an apparatus for manufacturing an optical preform, which apparatus includes
   means for supporting a tube,
   heating means for heating a portion of said tube to form a hot zone therein,
   means for providing relative longitudinal movement between said tube and said tube portion heating means, and
   means for introducing into one end of said tube a reactant gas mixture which flows through said hot zone and, when heated therein, forms particulate material, at least a portion of which flows downstream from said hot zone where at least a portion thereof comes to rest and forms a deposit on the inner surface of said tube in a region thereof that is cooler than that portion of said tube that surrounds said hot zone,
   the improvement comprising
   a cylindrically-shaped member of refractory material extending axially throughout the entire length of said tube, and
   means for heating said member in a nonuniform manner, said means for heating said member supplying a greater amount of heat to that portion of said member which is located in said one end of said tube and supplying a gradually decreasing amount of heat to the remaining portion of said member.

3. In the method of manufacturing an optical preform, which includes the steps of
   flowing through a tube a gas which, when heated, forms glass particles,
   moving a heat source along the outside of said tube whereby at least a portion of said gas is converted to glass particles and at least a portion of said glass particles is deposited on the inside of said tube, and
   generating throughout the entire length of said tube a temperature gradient whereby the temperature increases toward the axis of said tube,
   the invention characterized in that the flow of said gas during said step of flowing is variable, said flow being greatest when said heat source is at the upstream end of said tube, said flow continually decreasing as said heat source moves away from said upstream end.

4. In an apparatus for manufacturing an optical preform, which apparatus includes
   means for supporting a tube,
   first heating means for heating a portion of said tube to form a hot zone therein,
   means for providing relative longitudinal movement between said tube and said first heating means,
   means for introducing into one end of said tube a reactant gas mixture which flows through said hot zone and, when heated therein, forms particulate material, at least a portion of which flows downstream from said hot zone where at least a portion thereof comes to rest and forms a deposit on the inner surface of said tube in a region thereof that is cooler than that portion of said tube that surrounds said hot zone, and
   second heating means extending axially throughout the entire length of said tube,
   the invention characterized in that said means for introducing a reactant gas mixture comprises valve means for varying the flow rate of said mixture, and control means responsive to the position of said first heating means for controlling the rate of flow of said mixture so that a given amount of said mixture flows into said first tube when said first heating means is at the first end thereof, the flow rate of said mixture decreasing as said first heating means traverses said first tube toward the remaining end thereof.

* * * * *